(12) United States Patent
Abe et al.

(10) Patent No.: US 7,976,063 B2
(45) Date of Patent: Jul. 12, 2011

(54) AIRBAG AND AIRBAG DEVICE

(75) Inventors: Kazuhiro Abe, Tokyo (JP); Masayoshi Kumagai, Tokyo (JP); Akira Nakajima, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/670,831

(22) PCT Filed: May 26, 2008

(86) PCT No.: PCT/JP2008/059635
§ 371 (c)(1),
(2), (4) Date: Jun. 8, 2010

(87) PCT Pub. No.: WO2009/013932
PCT Pub. Date: Jan. 29, 2009

(65) Prior Publication Data
US 2010/0289252 A1    Nov. 18, 2010

(30) Foreign Application Priority Data

Jul. 26, 2007  (JP) .................................. 2007-195245

(51) Int. Cl.
*B60R 21/16* (2006.01)
(52) U.S. Cl. .................................................. 280/743.1
(58) Field of Classification Search ............... 280/743.1, 280/736, 740
See application file for complete search history.

(56) References Cited

U.S. PATENT DOCUMENTS

| | | | |
|---|---|---|---|
| 6,042,147 A | 3/2000 | Nishijima et al. | |
| 6,086,092 A | 7/2000 | Hill | |
| 6,834,884 B2 * | 12/2004 | Gu | 280/729 |
| 7,334,812 B2 | 2/2008 | Abe | |
| 7,458,607 B2 * | 12/2008 | Abe | 280/739 |
| 7,726,685 B2 * | 6/2010 | Abe et al. | 280/736 |
| 2002/0005639 A1 | 1/2002 | Varcus | |
| 2006/0192371 A1 * | 8/2006 | Abe | 280/739 |

FOREIGN PATENT DOCUMENTS

| | | | |
|---|---|---|---|
| JP | H06-127330 A | | 5/1994 |
| JP | 07156730 A | * | 6/1995 |
| JP | H09-202201 A | | 8/1997 |
| JP | 2001-158315 A | | 6/2001 |
| JP | 2001-277974 A | | 10/2001 |
| JP | 2001-277988 A | | 10/2001 |
| JP | 2002-029354 A | | 1/2002 |
| JP | 3398787 B2 | | 4/2003 |
| JP | 2006-021577 A | | 1/2006 |
| JP | 2006-151350 A | | 6/2006 |
| JP | 3878220 B2 | | 2/2007 |

* cited by examiner

*Primary Examiner* — Faye M. Fleming
(74) *Attorney, Agent, or Firm* — Fitch Even Tabin & Flannery

(57) ABSTRACT

Provided are an airbag and an airbag device whose size of a package when the airbag is folded can be reduced while demonstrating effects of an inner chamber. An airbag device in the present invention includes a gas generator configured to generate gas under predetermined conditions, an airbag connected to the gas generator to be inflated and deployed, and a retainer configured to accommodate the airbag. The airbag includes an inner panel arranged in the interior thereof and a connection panel having a surface area smaller than the inner panel, and the inner panel includes a center seamed portion connected to an inner surface of the airbag with respect to the direction of thickness and a plurality of outer peripheral seamed portions connected to the connection panel which is arranged on the inner surface of the airbag apart from the portion where the center seamed portion is connected. The outline of the inner panel 4 between the outer peripheral seamed portions when the inner panel is deployed in a plane is formed into a shape following a straight line connecting the outer peripheral seamed portions.

10 Claims, 10 Drawing Sheets

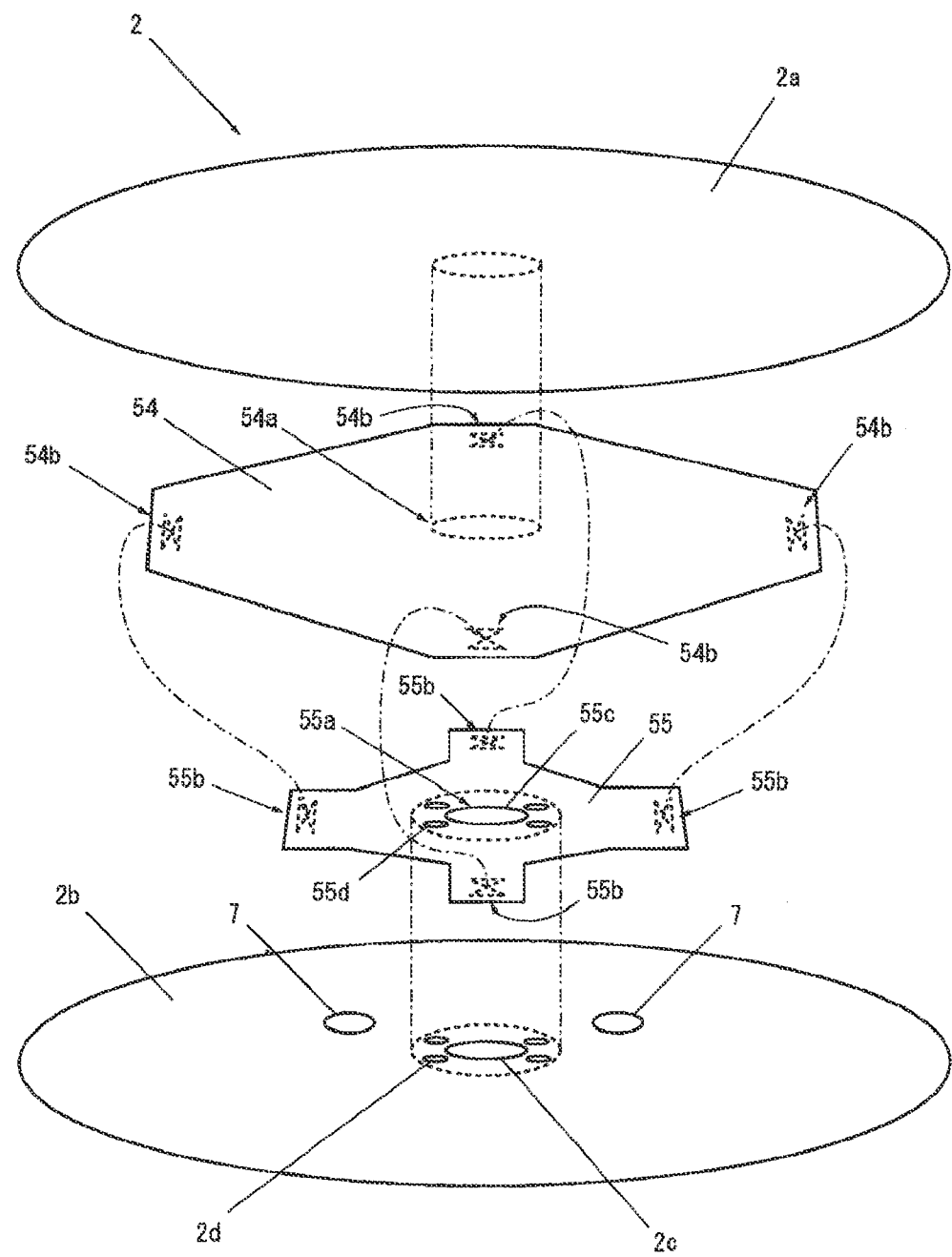

US 7,976,063 B2

AIRBAG AND AIRBAG DEVICE

CROSS-REFERENCE TO RELATED APPLICATIONS

This application is a U.S. national phase application filed under 35 U.S.C. §371 of International Application PCT/JP2008/059635, filed on May 26, 2008, designating the United States, which claims priority from Japanese Application 2007-195245, filed Jul. 26, 2007, which are hereby incorporated herein by reference in their entirety.

FIELD OF THE INVENTION

The present invention relates to an airbag and an airbag device mounted on a vehicle such as an automotive vehicle and, more specifically, to an airbag and an airbag device having an inner chamber.

BACKGROUND OF THE INVENTION

Mounting an airbag device configured to absorb an impact applied on an occupant by inflating and deploying an airbag in a cabin in case of collision or sudden deceleration on a vehicle such as an automotive vehicle is becoming popular. As such an airbag device, various types such as a driver airbag device mounted in the interior of a steering, a passenger airbag device mounted in the interior of an instrument panel, side airbag devices mounted in the interiors of vehicle side surface portions or in the interiors of seats, curtain airbag devices mounted in the interiors of upper portions of doors, knee airbag devices corresponding to knees of the occupants, a pedestrian airbag device mounted in the interior of a portion under a hood, and so on are developed and employed. Recently, a motorcycle airbag is also developed.

Such an airbag device is generally included a gas generator configured to generate gas under predetermined conditions, an airbag configured to be inflated and deployed by being connected to the gas generator, and a retainer configured to store an airbag. Various types of shapes and configurations of the airbag are applied according to the places to be installed and required functions or the like.

Here, airbags described in U.S. Pat. No. 6,086,092 and Japanese Unexamined Patent Application Publication No. 2006-151350 are configured to have a small chamber (first chamber, inner bag, etc.) in the airbag, and allow gas from an inflator to flow into the airbag step by step. In this configuration, a center portion of the airbag can be inflated and deployed prior to an outer peripheral portion of the airbag, the airbag can be projected quickly, a space with respect to the occupant can be filled quickly, and a gas flow into the outer peripheral portion can be accelerated because the length in the direction of thickness is restrained. The small chamber is referred to as an inner chamber, hereinafter.

However, when providing the inner chamber in the airbag, the amount of base cloth to be used for the entire airbag is increased inevitably, and the size of a package when the airbag is folded is also increased. Therefore, there arise problems that the cost of the airbag is increased, the retainer cannot accommodate the airbag, or upsizing of the retainer is required or the like. In contrast, if the amount of the base cloth of the inner chamber is reduced too much, there arises a problem that it does not function as the inner chamber. There is also a problem that a seamed portion formed when the inner chamber is connected in the airbag has high rigidity and hence resists easy folding, and hence the size of the package when the airbag is folded is likely to be increased.

SUMMARY OF THE INVENTION

The present invention is devised in view of such problems described above, and it is an object of the present invention to provide an airbag and an airbag device which allow reduction of the size of a package when the airbag is folded while demonstrating an effect of an inner chamber.

According to the present invention, there is provided an airbag configured to be inflated and deployed by gas supplied therein including: an inner panel to be arranged in the interior of the airbag, the inner panel including a center seamed portion to be connected to an inner surface of the airbag with respect to the direction of thickness and a plurality of outer peripheral seamed portions to be connected to an inner surface of the airbag apart from the portion where the center seamed portion is connected, wherein the outline of the inner panel between the outer peripheral seamed portions when the inner panel is deployed into a plane is formed into a shape smaller than an arcuate shape which constitutes part of a circle passing through all the outer peripheral seamed portions and larger than an inverted arcuate shape formed by inverting the arcuate shape with respect to a straight line connecting the outer peripheral seamed portions.

The outline of the inner panel may be formed into a shape following the straight line connecting the outer peripheral seamed portions. The inner panel may be formed into a polygonal shape as an entire outline when being deployed into a plane. Also, the outer peripheral seamed portions may be arranged at two to four positions equidistantly on an outer periphery of the inner panel. Furthermore, a surface area of an area where the inner panel and the airbag are overlapped when the airbag may be deployed into a plane in a state in which the inner panel is connected to the airbag is 0.2 to 0.6 times a surface area of the airbag.

The airbag includes a connection panel having a surface area smaller than that of the inner panel and the outer peripheral seamed portions and the inner surface of the airbag may be connected via the connection panel. The airbag may include a front panel to be arranged on the side of an occupant, and a rear panel to be arranged on the side of a vehicle structure, wherein the center seamed portion is connected to the front panel or the rear panel, and the outer peripheral seamed portions may be connected to the rear panel or the front panel to which the center seamed portion is not connected.

The airbag may include a vent hole for discharging gas and an insertion hole formed in the vicinity of the vent hole, and include a vent cover connected at one end thereof to an outer surface of the airbag so as to cover the vent hole, and a strap connected to the inner panel, and the strap may be connected at the other end of the vent cover via the insertion hole. The strap may be integrally formed with the inner panel or the vent cover.

Also, according to the present invention, there is provided an airbag device having a gas generator configured to generate gas under predetermined conditions, an airbag connected to the gas generator to be inflated and deployed, and a retainer configured to store the airbag, the airbag including an inner panel to be arranged in the interior of the airbag, the inner panel including a center seamed portion to be connected to an inner surface of the airbag with respect to the direction of thickness and a plurality of outer peripheral seamed portions to be connected to an inner surface of the airbag apart from the portion where the center seamed portion is connected, wherein the outline of the inner panel between the outer peripheral seamed portions when the inner panel is deployed into a plane is formed into a shape smaller than an arcuate shape which constitutes part of a circle passing through all the outer peripheral seamed portions and larger than an inverted arcuate shape formed by inverting the arcuate shape with respect to a straight line connecting the outer peripheral seamed portions.

The outline of the inner panel may be formed into a shape following the straight line connecting the outer peripheral seamed portions. The inner panel may be formed into a polygonal shape as an entire outline when being deployed into a plane. Also, the outer peripheral seamed portions may be arranged at two to four positions equidistantly on an outer periphery of the inner panel. Furthermore, a surface area of an area where the inner panel and the airbag are overlapped when the airbag may be deployed into a plane in a state in which the inner panel is connected to the airbag is 0.2 to 0.6 times a surface area of the airbag.

The airbag includes a connection panel having a surface area smaller than that of the inner panel and the outer peripheral seamed portions and the inner surface of the airbag may be connected via the connection panel. The airbag may include a front panel to be arranged on the side of an occupant, and a rear panel to be arranged on the side of a vehicle structure, wherein the center seamed portion is connected to the front panel or the rear panel, and the outer peripheral seamed portions may be connected to the rear panel or the front panel to which the center seamed portion is not connected.

The airbag may include a vent hole for discharging gas and an insertion hole formed in the vicinity of the vent hole, and include a vent cover connected at one end thereof to an outer surface of the airbag so as to cover the vent hole, and a strap connected to the inner panel, and the strap may be connected at the other end of the vent cover via the insertion hole. The strap may be integrally formed with the inner panel or the vent cover.

Advantages

According to the airbag and the airbag device in the present invention described above, by forming the outline of the inner panel which constitutes an inner chamber within a range of being smaller than the arcuate shape which constitutes part of the circle passing through all the outer peripheral seamed portions and larger than the inverted arcuate shape formed by inverting the arcuate shape with respect to the straight line connecting the outer peripheral seamed portions, the amount of usage of a base cloth is reduced and the size of a package when the airbag is folded can be reduced while demonstrating effects of the inner chamber. Also, since the seamed portion between the inner panel and the airbag can be reduced, the airbag can easily be folded and the size of the package can be reduced.

Also, by forming the outline of the inner panel into the shape following along the straight line connecting the outer peripheral seamed portions, or by forming the entire outline into a polygonal shape, the inner panel which demonstrates the effect of the present invention can be formed easily. Also, by arranging the outer peripheral seamed portions at two to four positions equidistantly, the function of the inner chamber can be demonstrated effectively. Also, by setting the surface area of the area where the inner panel and the airbag are overlapped when the airbag may be deployed into a plane to 0.2 to 0.6 times the surface area of the airbag, the function of the inner chamber can be demonstrated effectively.

Also, by providing the connection panel, the inner panel and the airbag can be connected easily. Also, when the airbag includes the front panel and the rear panel, by connecting the center seamed portion to one of the panels, and connecting the outer peripheral seamed portions to the other panel, the inner chamber can be formed easily. Also, when the airbag is formed with the vent hole, by connecting the strap to the inner panel, opening and closing of the vent cover is achieved, so that leakage of gas during the inflation and deployment of the airbag can be reduced. Furthermore, when the strap is formed integrally with the inner panel or the vent cover, the number of seamed portions may be reduced.

BRIEF DESCRIPTION OF THE DRAWINGS

FIG. 2 is an explanatory drawing of an inner panel in which

FIG. 3 is an explanatory drawing showing actions of the airbag device according to the present invention in which

FIG. 4 is a comparative drawing of actions between the airbag device in the present invention and an airbag device in the related art, in which

FIG. 5 is a partial component exploded view of the airbag device according to a second embodiment of the present invention.

FIG. 10 is a drawing showing a seventh embodiment of the airbag device according to the present invention, in which

DETAILED DESCRIPTION OF THE PREFERRED EMBODIMENTS

Figure 1:
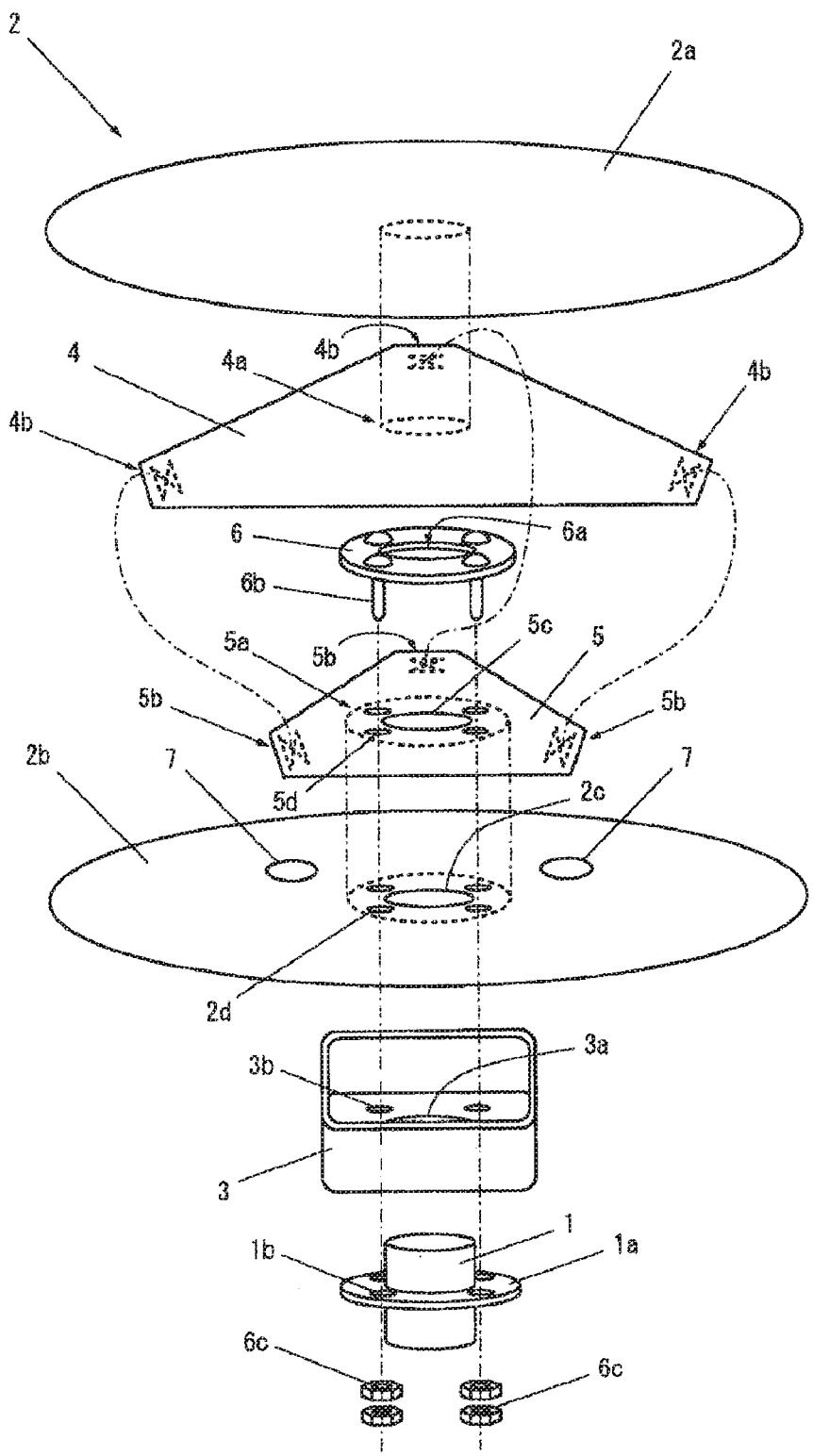
FIG. 1 is a partial component exploded view of an airbag device according to a first embodiment of the present invention.
Figure 2A:
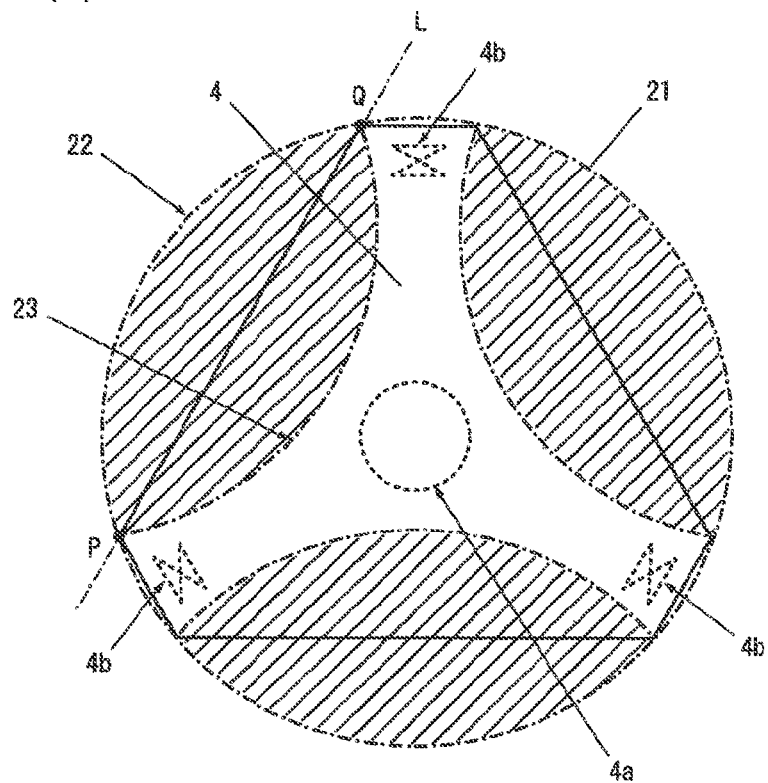
FIG. 2(A) is a plan deployed view of the inner panel.
Figure 2B:
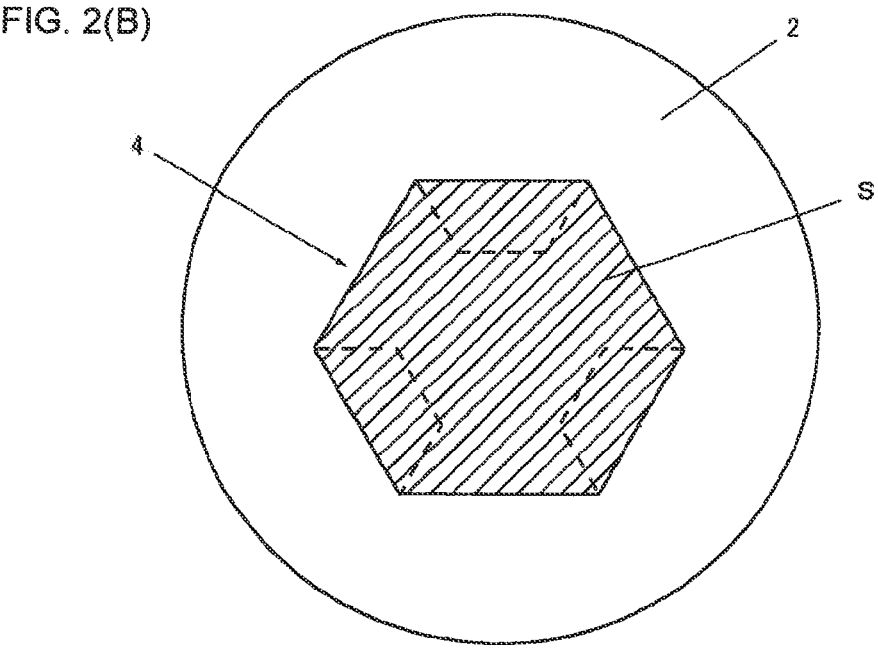
FIG. 2(B) is a plan deployed view of an airbag having the inner panel connected thereto.

Referring now to FIG. 1 to FIG. 10, an embodiment of the present invention will be described. Here, FIG. 1 is a component exploded view showing a first embodiment of an airbag device according to the present invention, FIG. 2 is an explanatory drawing of an inner panel in which FIG. 2(A) is a plane deployed view of the inner panel, and FIG. 2(B) is a plan deployed view of the airbag including the inner panel connected thereto.

The airbag device according to the present invention shown in FIG. 1 includes a gas generator 1 configured to generate gas under predetermined conditions, an airbag 2 connected to the gas generator 1 and configured to be inflated and deployed, and a retainer 3 configured to accommodate the airbag 2. The airbag 2 includes an inner panel 4 to be arranged in the interior thereof, and a connection panel 5 having a smaller surface area than the inner panel 4. The inner panel 4 includes a center seamed portion 4a to be connected to an inner surface with respect to the direction of thickness of the airbag 2, and a plurality of (three in this case) outer peripheral seamed portions 4b to be connected to the connection panel 5 arranged in the inner surface of the airbag 2 at a position apart from the portion where the center seamed portion 4a is connected. The outline of the inner panel 4 between the outer peripheral seamed portions 4b, 4b when the inner panel 4 is developed into a plane is formed into a shape following straight lines connecting the outer peripheral seamed portions 4b, 4b. The airbag 2 is fixed to the retainer 3 via a hold ring 6.

The gas generator 1 is a component which is generally called an inflator, having a substantially cylindrical shaped outline and being formed with gas injection ports around side peripheral surface of a distal end thereof enveloped by the airbag 2. The gas generator 1 also has a flange portion 1a at a center portion thereof, which is formed with a plurality of (four in this case) bolt holes 1b. The gas generator 1 as described above is connected to an ECU (electronic control unit), not shown, and is controlled on the basis of a measured value of an acceleration sensor or the like. When the ECU senses or estimates a collision or a sudden deceleration of a vehicle, the gas generator 1 is ignited by an ignition current from the ECU, burns medicament stored in the interior of the gas generator 1, thereby generating gas, and supplies gas to the airbag 2.

The airbag 2 includes a front panel 2a arranged on the side of an occupant, and a rear panel 2b arranged on the side of a vehicle structure. The front panel 2a and the rear panel 2b are formed respectively into a substantially disk shape, and are seamed along these peripheral edge portions to form a shell as an internal pressure holding element of the airbag 2. The rear panel 2b is formed with an opening 2c at a center portion thereof for guiding the gas generator 1 into the interior of the airbag 2, and a plurality of (four in this case) bolt holes 2d are formed around the opening 2c. The rear panel 2b may be formed with vent holes 7, 7 for discharging gas in the airbag 2.

The retainer 3 is formed into a box shape and is formed with an opening 3a at a center portion of a bottom portion thereof for guiding the gas generator 1 into the interior of the airbag 2, and a plurality of (four in this case) bolt holes 3b are formed around the opening 3a. There are various shapes of the retainer 3 and, for example, a side surface portion and the bottom portion of the retainer 3 may be formed of different members. In this case, the bottom portion may be referred to as the retainer, and the side surface portion may be referred to as a module cover. However, in this specification, these members are generically referred to as the retainer. In other words, the retainer 3 is a generic designation of a member for fixing the gas generator 1 and the airbag 2, and a member for storing the airbag 2.

The inner panel 4 is a member which constitutes an inner chamber when the airbag 2 is inflated and deployed, and is connected at the center seamed portion 4a to the front panel 2a, and at the outer peripheral seamed portions 4b to the rear panel 2b via the connection panel 5. In the first embodiment, the outer peripheral seamed portions 4b are arranged at regular intervals at three portions of an outer periphery of the inner panel 4, and the inner panel 4 is formed into a substantially rectangular shape as a whole. The present invention is mainly characterized in that the outline of the inner panel 4 is formed to have certain size and shape to reduce the amount of usage of the base cloth while demonstrating a function as the inner chamber. Also, since the inner panel 4 is connected to the airbag 2 only at the outer peripheral seamed portions 4b instead of the entire periphery of the inner panel 4, so that the seamed portion having high rigidity is reduced. When connecting the inner panel 4 and the connection panel 5, an outer surface (an upper surface in FIG. 1) of the outer peripheral seamed portions 4b of the inner panel 4 may be fixed up and seamed to an inner surface (the upper surface in FIG. 1) of the connection panel 5, or an inner surface (a lower surface in FIG. 1) of the outer peripheral seamed portions 4b of the inner panel 4 may be fixed up and seamed to an outer surface (the lower surface in FIG. 1) of the connection panel 5.

As shown in FIG. 2(A), the outline of the inner panel between the outer peripheral seamed portions 4b, 4b when the inner panel 4 is deployed into a plane is formed to be smaller than an arcuate shape 22 (arc PQ) which constitutes part of a circle 21 passing through all the outer peripheral seamed portions 4b, and larger than an inverted arcuate shape 23 formed by inverting the arcuate shape 22 (the arc PQ) with respect to a straight line L which connects the outer peripheral seamed portions 4b, 4b. In other words, what is essential for the outline of the inner panel 4 is simply to be formed so as to be accommodated within hatched ranges in FIG. 2(A), and may be any one of a straight-line shape, a curved shape, a polygonal shape, or a shape including the straight line and the curved line. In the first embodiment shown in FIG. 1, the outline of the inner panel 4 is formed along the straight line L connecting the outer peripheral seamed portions 4b, 4b. As a method of setting the circle 21, a variety of patterns are contemplated according to the shape of the outer peripheral seamed portions 4b and, in FIG. 2(A), it is set as a circumscribed circle of the outer peripheral seamed portions 4b. As the method of setting the circle 21, it is also possible to set parts of the shape of the panel at the outer peripheral seamed portions 4b, set connecting points which are wanted to form the outline of the inner panel 4 on the respective outer peripheral seamed portions 4b, and set the circle so as to pass all the connecting points.

Also, when setting the outline of the inner panel 4, conditions of area ratio may be taken into consideration as shown in FIG. 2(B). FIG. 2(B) is a plan deployed view of the airbag 2 to which the inner panel 4 is connected, and an area S where the inner panel 4 and the airbag 2 are overlapped is hatched. Then, the outline is set so that the surface area of the area S falls within a range from 0.2 to 0.6 times a surface area T of the airbag 2. By setting the surface area of the area S in this manner, the inner panel 4 can be functions as the inner chamber while reducing the amount of usage of the base cloth for the inner panel 4 effectively. The inner panel 4 serves as accumulating gas temporarily as the inner chamber and, simultaneously serves as a tether which adjusts the thickness of the airbag 2. The size of the surface area of the area S varies with the setting of the thickness of the airbag 2. Therefore, one of the airbags 2 which are being in volume production is sampled, and the length of the tether in a range from about 180 mm to about 350 mm is set, and then a surface ratio described above is calculated.

The connection panel 5 is a member which connects the airbag 2 and the inner panel 4. The connection panel 5 includes a center seamed portion 5a connected to the rear panel 2b and an outer peripheral seamed portion 5b connected to the outer peripheral seamed portions 4b of the inner panel 4. The connection panel 5 is formed with an opening 5c at a center portion thereof for guiding the gas generator 1 into the interior of the airbag 2, and a plurality of (four in this case) bolt holes 5d are formed around the opening 5c. The connection panel 5 is configured simply to facilitate seaming of the inner panel 4 to the airbag 2, and hence is formed into a shape smaller than the inner panel 4. The connection panel 5 in the first embodiment shown in FIG. 1 is formed into a shape obtained by reducing the inner panel 4. However, the invention is not limited to the shape described above. Also, as described later, the connection panel 5 is not an essential component.

The hold ring 6 is a member for fixing the airbag 2 and the connection panel 5 to the retainer 3. The hold ring 6 is formed with an opening 6a at a center portion thereof for guiding the gas generator 1 into the interior of the airbag 2, a plurality of (four in this case) bolt holes 6a are formed around the opening 2c, and bolts 6b are inserted into the respective bolt holes. The bolts 6b are inserted into the bolt holes 5d of the connection panel 5, the bolt holes 2d of the rear panel 2b, the bolt holes 3b of the retainer 3, the bolt holes 1b of the gas generator 1 in sequence, and are finally tightened with nuts 6c.

Figure 3A:
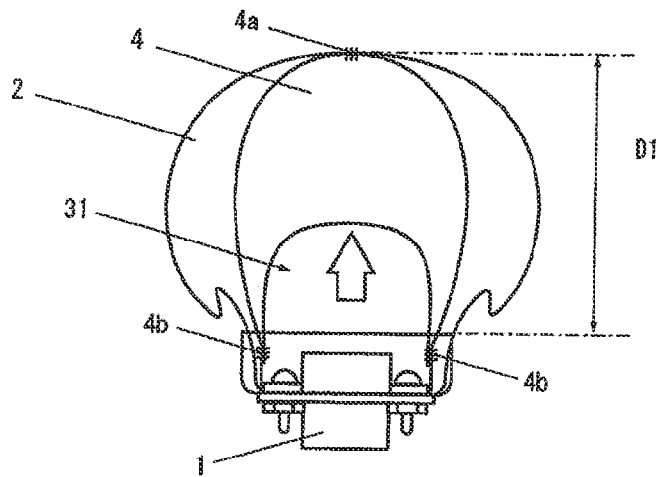
FIG. 3(A) illustrates an initial stage of inflation of the airbag.
Figure 3B:
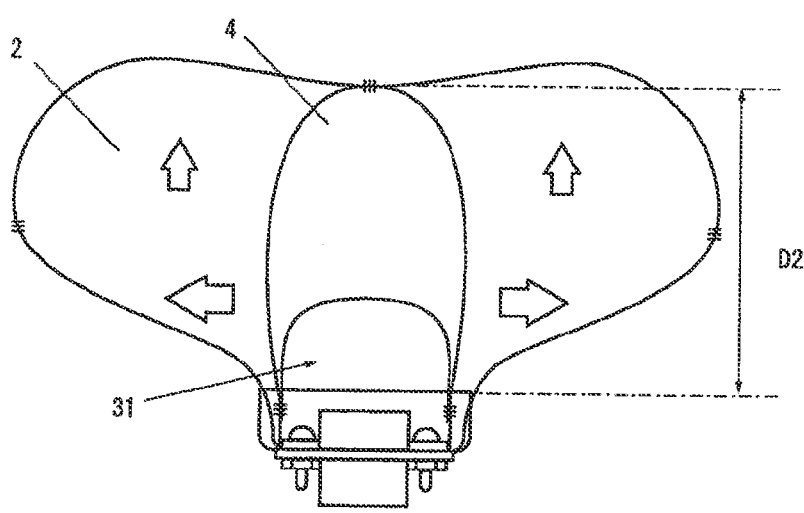
FIG. 3(B) illustrates a middle stage of inflation of the airbag.
Figure 3C:
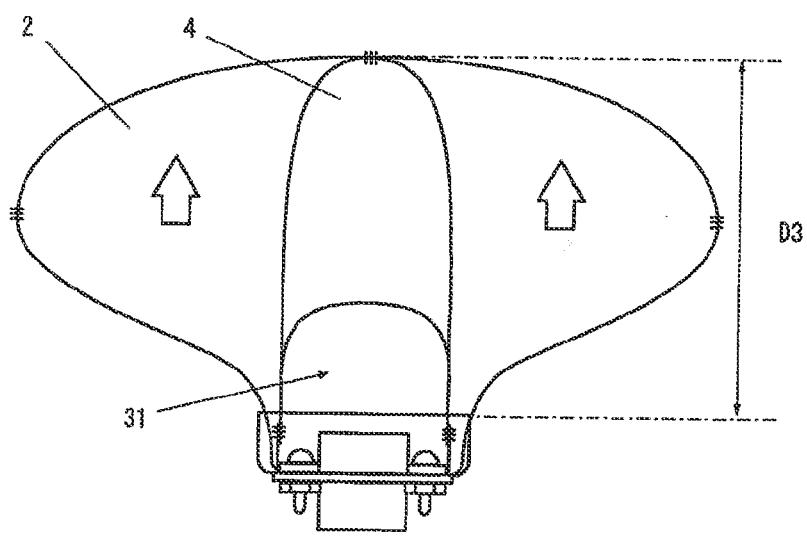
FIG. 3(C) illustrates a final stage of inflation of the airbag.
Figure 4A:
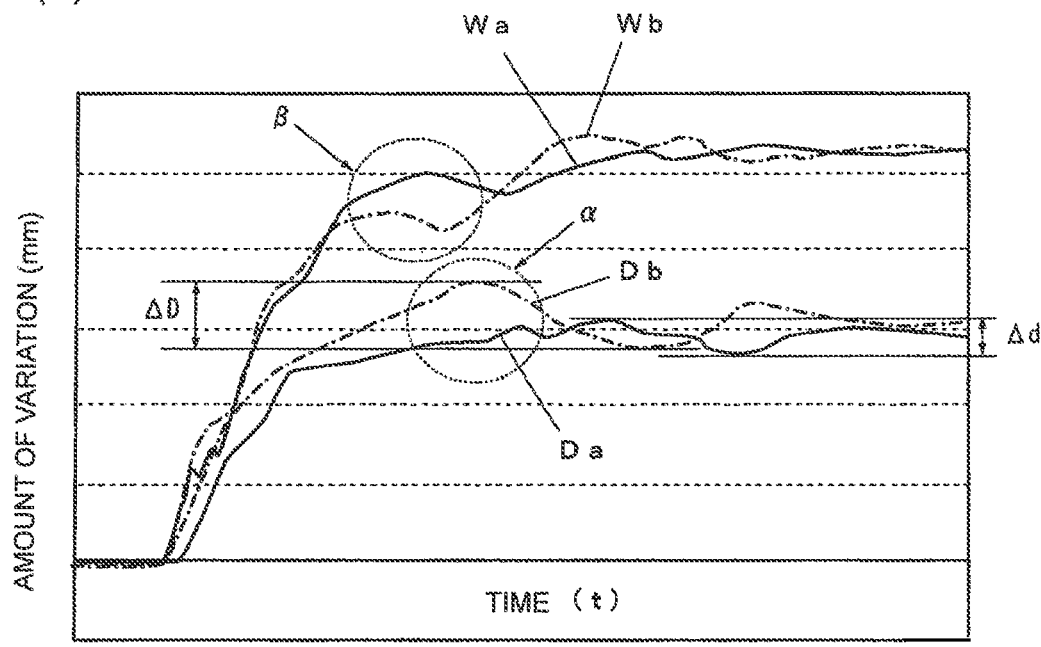
FIG. 4(A) shows the amount of variations of the respective airbags.
Figure 4B:
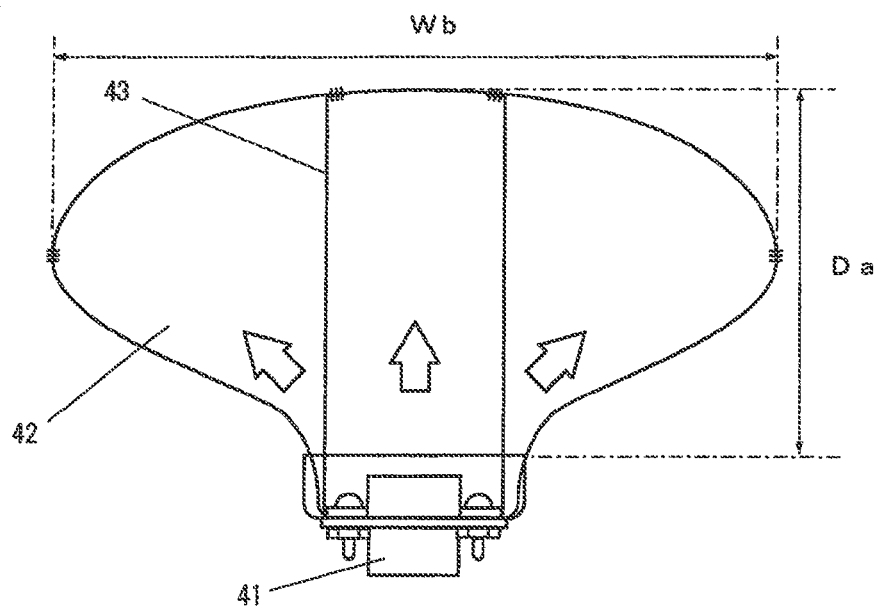
FIG. 4(B) is a drawing showing the airbag device in the related art.

Subsequently, actions of the airbag device of the present invention will be described. Here, FIG. 3 is an explanatory drawing showing the actions of the airbag device in the present invention, in which FIG. 3(A) shows an initial stage of inflation of the airbag, FIG. 3(B) is a middle stage of inflation of the airbag, and FIG. 3(C) is a final stage of inflation of the airbag. FIG. 4 is a drawing in which actions of the airbag device in the present invention and those of the airbag device in the related art are compared, in which FIG. 4(A) shows the amounts of variation of the respective airbags, and FIG. 4(B) shows the airbag device in the related art. In the respective drawings, arrows in the drawings indicate an image of gas flow.

When the gas generator 1 is activated by a command from the ECU, gas is supplied into the airbag 2. In the initial stage of inflation of the airbag 2, as shown in FIG. 3(A), gas is intensively supplied to the inner panel 4 first, and hence near a center portion of the airbag 2 is inflated and deployed first. In other words, the inner panel 4 functions as the inner chamber of the airbag 2. Here, the amount of variation of the airbag 2 in the direction of thickness is designated as D1. At this time, the airbag 2 is inflated and deployed into a substantially spherical shape. Also, by the inner panel 4 functioning as the inner chamber, the amount of projection in the direction of inflation and deployment in the initial stage (the amount of variation D1) can be restrained in comparison with the airbag having no inner chamber.

As shown in FIG. 3(B), in the middle stage of inflation of the airbag 2, gas is supplied to an outer periphery of the airbag 2 from a communicating port 31 formed by the outline of the inner panel 4 between the outer peripheral seamed portions 4b, 4b, so that an outer peripheral portion of the airbag 2 is inflated and deployed in the lateral width direction, and is inflated and deployed gradually in the direction of thickness as well. When the amount of variation of the airbag 2 in the direction of thickness at this time is designated as D2, since the amount of variation D1 in the initial stage of inflation is restrained in the present invention, the relation will be D1<D2. In contrast, in the case of the airbag having no inner chamber, since the amount of variation D1 in the initial stage of inflation is large, the relation D1>D2 is established in the middle stage of inflation, which may cause an amplitude. In the present invention, the amplitude as described above may be reduced.

As shown in FIG. 3(C), in the final stage of inflation of the airbag 2, the airbag 2 is inflated and deployed entirely in the direction of thickness. When the amount of variation of the airbag 2 in the direction of thickness at this time is designated as D3, the relation D2<D3 is established. Therefore, when the airbag 2 is inflated and deployed, the width in the direction of thickness is varied to D1<D2<D3, and a top portion of the airbag 2 is gradually inflated and deployed. In the airbag 2 of the present invention, since the shape of the inner panel 4 is set so as to be able to function as the inner chamber while reducing the amount of usage of the base cloth of the inner panel 4 which constitutes the inner chamber, the communicating port 31 having a sufficient size is secured naturally, so that the amplitude of the outer peripheral portion of the airbag 2 can also be reduced. Also, since the communicating port 31 having a sufficient size is secured, the airbag 2 can be manufactured easily without the need to consider alignment or displacement between the communicating port 31 and the position of the gas injection port of the gas generator 1 intentionally.

Here, actions of the airbag device in the present invention and those of an airbag device in the related art will be compared. In FIG. 4(A), the amount of variation of the airbag 2 in the direction of thickness in the present invention is expressed by a solid line Da and the amount of variation of the same is expressed by a solid line Wa. Also, the amount of variation of an airbag 42 in the related art in the direction of thickness as shown in FIG. 4(B) is expressed by a chain line Db and the amount of variation in the lateral width direction is expressed by a chain line Wb. In FIG. 4(B), the airbag device in the related art includes a gas generator 41, the airbag 42, and a tether 43. The tether 43 is a member in the shape of a cord for restricting the shape of the airbag 42 in the direction of thickness, and does not have a function as the inner chamber. Therefore, in the airbag device in the related art, gas from the gas generator 41 is supplied entirely to the airbag 42.

As shown in FIG. 4(A), the amount of variation Db of the airbag 42 in the related art in the direction of thickness is larger than the amount of variation Da of the airbag 2 in the present invention in the direction of thickness as a whole. For example, in a portion α showing the maximum amount of variation of the airbag 42 in the related art, a large difference is generated from the amount of variation Da of the airbag 2 in the present invention. Also, when the maximum amount of amplitude ΔD of the airbag 42 in the related art and the maximum amount of amplitude Δd of the airbag 2 in the present invention are compared, it is easily understood that the maximum amount of amplitude Δd of the airbag 2 in the present invention is apparently smaller than the maximum amount of amplitude ΔD of the airbag 42.

As shown in FIG. 4(A), in the case where the amount of variation Wb of the airbag 42 in the related art in the lateral width direction and the amount of variation Wa of the airbag 2 in the present invention in the lateral width direction are compared, it is understood easily that the amount of amplitude of the airbag 2 in the present invention is smaller than the amount of amplitude in the airbag 42 in the related art. In a portion β in the initial stage of inflation, the amount of variation Wa of the airbag 2 in the present invention in the lateral width direction is larger than the amount of variation Wb of the airbag 42 in the related art in the lateral width direction. This means that the gas is effectively supplied in the lateral width direction in the initial stage of inflation of the airbag 2, and supports the fact that the amount of amplitude in the direction of thickness is small. In this manner, according to the airbag device in the present invention, the inflation and deployment in the lateral width direction can be performed smoothly while restraining the amplitude of the airbag 2, and stable inflation and deployment of the airbag 2 is achieved, so that an impact exerted to the occupant can be absorbed effectively. Furthermore, increasing of the amount of variation Wa in the initial stage of inflation of the airbag 2 means that the airbag 2 can be interposed in front of the abdominal part of the occupant in an early stage, so that an occupant constraining performance of the airbag 2 in an initial stage of collision is effectively improved.

Subsequently, a second embodiment of the airbag device of the present invention will be described. Here, FIG. 5 is a partial component exploded view of the airbag device according to the second embodiment of the present invention. In FIG. 5, illustration of the gas generator 1, the retainer 3, and the hold ring 6, which are the common components as in FIG. 1 is omitted.

In the second embodiment shown in FIG. 5, the shape of an inner panel 54 is formed to be a substantially square shape as a whole. In other words, outer peripheral seamed portions 54b are arranged equidistantly at four positions of an outer periphery of the inner panel 54. The shape of the inner panel 54 between the outer peripheral seamed portions 54b, 54b are set under the same conditions as in the case of the inner panel 4 shown in FIG. 1. A center seamed portion 54a of the inner panel 54 is connected to the front panel 2a and the outer peripheral seamed portions 54b are connected to a connection panel 55. The connection panel 55, being formed into a substantially cross shape, has a center seamed portion 55a at a center portion thereof, and outer peripheral seamed portions 55b at respective ends of the cross shape. Formed at the center portion of the connection panel 55 is an opening 55c for guiding the gas generator 1 into the interior of the airbag 2 and formed around the opening 55c are a plurality of (four in this case) bolt holes 55d. In the second embodiment as well, the same advantages and effects as in the first embodiment are achieved.

Figure 6:
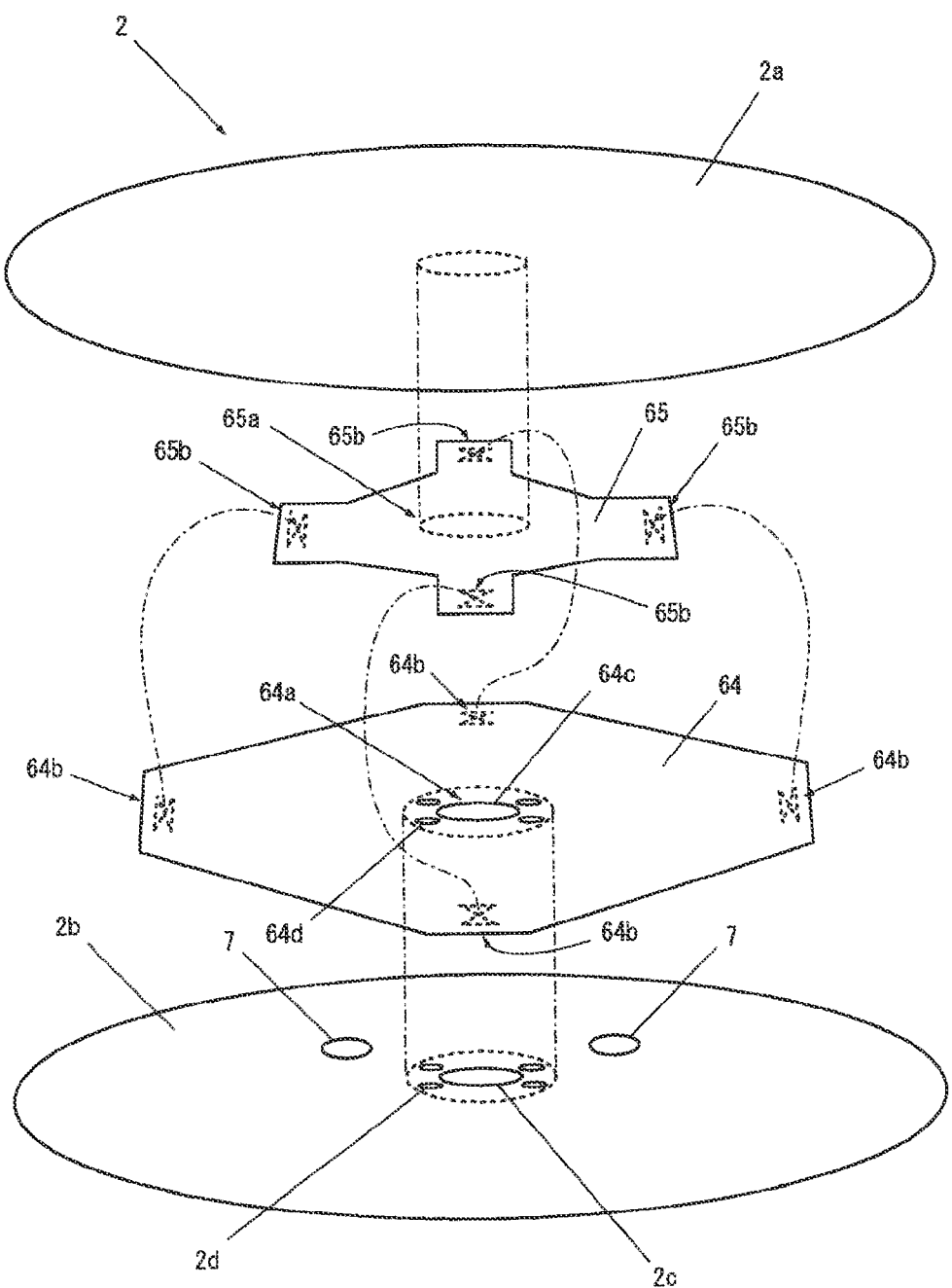
FIG. 6 is a partial component exploded view of the airbag device according to a third embodiment of the present invention.

Subsequently, a third embodiment of the airbag device according to the present invention will be described. Here, FIG. 6 is a partial component exploded view of the airbag device according to the third embodiment of the present invention. In FIG. 6, illustration of the gas generator 1, the retainer 3, the hold ring 6, which are the common components as in FIG. 1 is omitted.

In the third embodiment shown in FIG. 6, the positional relation between the inner panel 54 and the connection panel 55 shown in FIG. 5 is inverted. In other words, an inner panel 64 is connected to the rear panel 2b and a connection panel 65 is connected to the front panel 2a. Therefore, the inner panel 64 is formed with an opening 64c for guiding the gas generator 1 into the interior of the airbag 2, and a plurality of (four in this case) bolt holes 64d for allowing insertion of the bolts 6a of the hold ring 6 in addition to a center seamed portion 64a and an outer peripheral seamed portion 64b. Then, the connection panel 65 includes a center seamed portion 65a and outer peripheral seamed portions 65b arranged. In this manner, even when the positional relation between the inner panel and the connection panel is inverted, the same effects and advantages as in the first embodiment are achieved. Therefore, it is also possible to invert the positional relation between the inner panel 4 and the connection panel 5 in the first embodiment.

Figure 7:
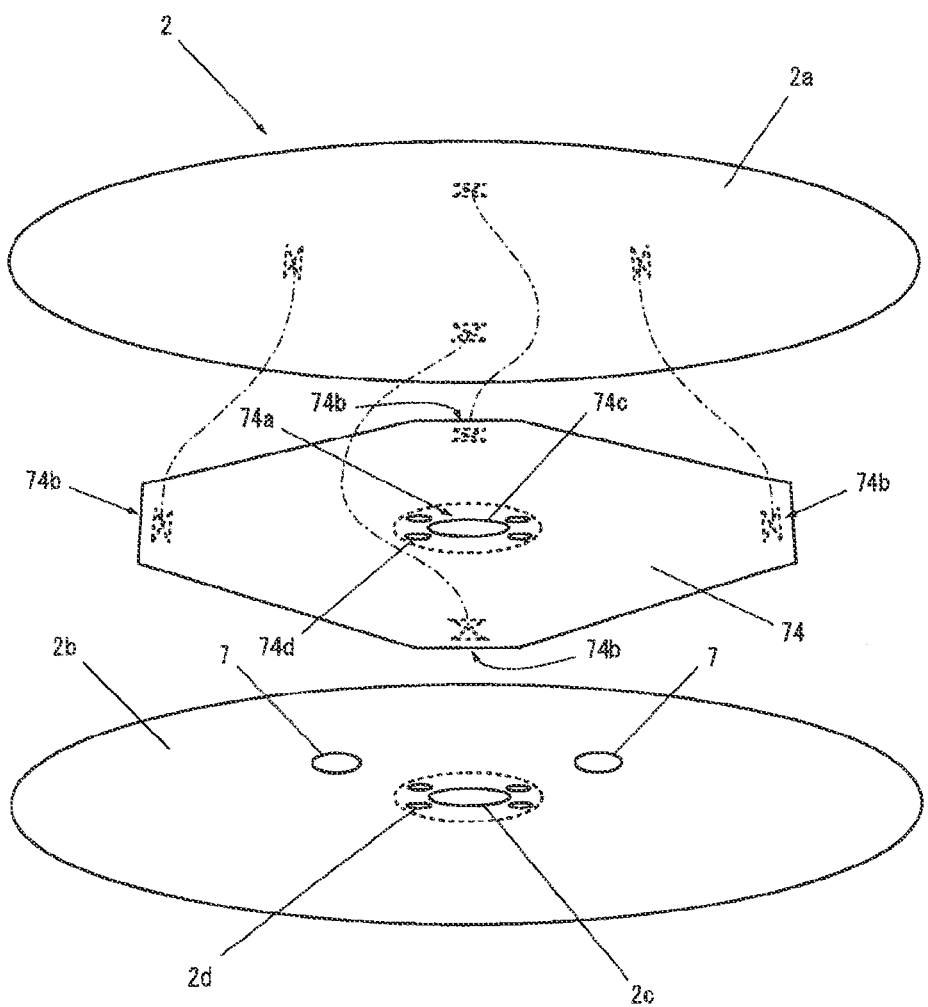
FIG. 7 is a partial component exploded view of the airbag device according to a fourth embodiment of the present invention.

Subsequently, a fourth embodiment of the airbag device according to the present invention will be described. Here, FIG. 7 is a partial component exploded view of the airbag device according to the fourth embodiment of the present invention. In FIG. 7, illustration of the gas generator 1, the retainer 3, and the hold ring 6, which are the common components as in FIG. 1 is omitted.

In the fourth embodiment shown in FIG. 7, the connection panel 65 shown in FIG. 6 is omitted. In other words, an inner panel 74 is connected directly to both of the front panel 2a and the rear panel 2b. The inner panel 74 is formed with an opening 74c for guiding the gas generator 1 into the interior of the airbag 2, and a plurality of (four in this case) bolt holes 74d for allowing insertion of the bolts 6a of the hold ring 6 in addition to a center seamed portion 74a and an outer peripheral seamed portion 74b. Then, the center seamed portion 74a is connected to the rear panel 2b and the outer peripheral seamed portion 74b is connected to the front panel 2a. When connecting the outer peripheral seamed portion 74b, an inner surface (an upper surface in FIG. 7) of the outer peripheral seamed portion 74b may be fixed up and seamed to an inner surface (a lower surface in FIG. 7) of the front panel 2a, and an outer surface (the lower surface in FIG. 7) of the outer peripheral seamed portion 74b may be fixed up and seamed to the inner surface (the lower surface in FIG. 7) of the front panel 2a. In this manner, even when the connection panel is omitted, the same effects and advantages as in the first embodiment are achieved.

Figure 8:
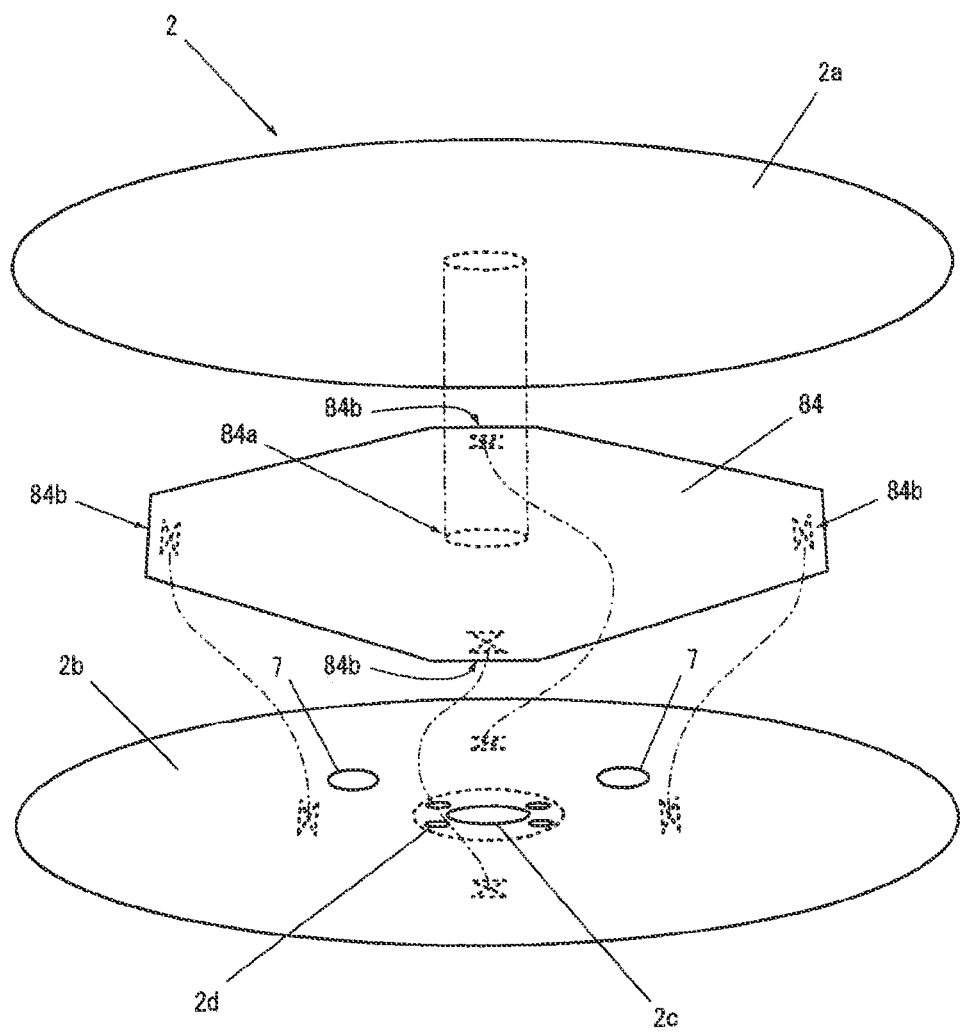
FIG. 8 is a partial component exploded view of the airbag device according to a fifth embodiment of the present invention.

Subsequently, a fifth embodiment of the airbag device according to the present invention will be described. Here, FIG. 8 is a partial component exploded view of the airbag device according to the fifth embodiment of the present invention. In FIG. 8, illustration of the gas generator 1, the retainer 3, and the hold ring 6, which are the common components as in FIG. 1 is omitted.

In the fifth embodiment shown in FIG. 8, the method of connecting the inner panel 74 shown in FIG. 7 is changed. In other words, a center seamed portion 84a of an inner panel 84 is connected to the front panel 2a and outer peripheral seamed portions 84b are connected to the rear panel 2b. In this case, it is not necessary to form an opening for guiding the gas generator 1 into the interior of the airbag 2 or the bolt hole for allowing the insertion of the bolt 6a of the hold ring 6 on the inner panel 84. Since other components are the same as those in the fourth embodiment shown in FIG. 7, overlapped description is omitted. In the fifth embodiment as well, the same advantages and effects as in the first embodiment are achieved. In the first embodiment shown in FIG. 1, the connection panel 5 may be omitted as in the fifth embodiment.

Figure 9:
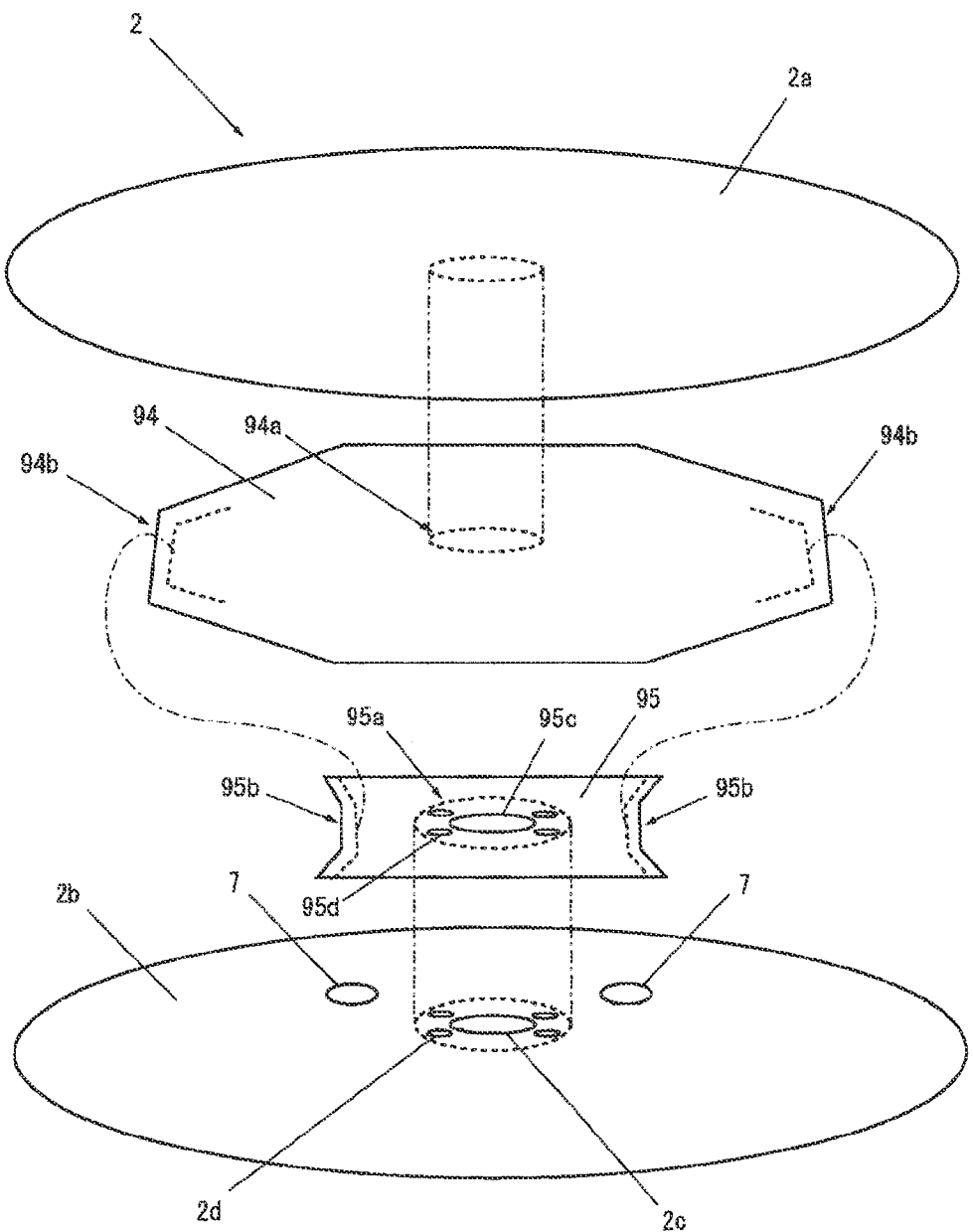
FIG. 9 is a partial component exploded view of the airbag device according to a sixth embodiment of the present invention.

Subsequently, a sixth embodiment of the airbag device according to the present invention will be described. Here, FIG. 9 is a partial component exploded view of the airbag device according to the sixth embodiment of the present invention. In FIG. 9, illustration of the gas generator 1, the retainer 3, the hold ring 6, which are the common components as in FIG. 1 is omitted.

In the sixth embodiment shown in FIG. 9, the shape of an inner panel 94 is formed to be a substantially square shape as a whole, and outer peripheral seamed portions 94b are arranged at two positions. In this case, although the shape of the inner panel 94 of portions between the outer peripheral seamed portions 94b, 94b may be formed so as to follow the straight line connecting the outer peripheral seamed portions 94b, 94b, intermediate portions are formed so as to be projected partly outward here. In this manner, when the outline of the inner panel 94 is set so as to be projected partly as well, the ranges to be projected are set under the same conditions as in the first embodiment. In contrast, a connection panel 95, being formed into a substantially rectangular shape, has recessed portions at both ends thereof, and outer peripheral seamed portions 95b are arranged so as to follow the recessed portions. Here, a center peripheral seamed portion 94a of the inner panel 94 is connected to the front panel 2a, and a center seamed portion 95a of the connection panel 95 is connected to the rear panel 2b. However, the positional relation between the inner panel 94 and the connection panel 95 may be inverted, or the connection panel 95 may be omitted. Formed on the connection panel 95 is an opening 95c for guiding the gas generator 1 into the interior of the airbag 2 and formed around the opening 95*c* are a plurality of (four in this case) bolt holes 95*d*. In the sixth embodiment as well, the same advantages and effects as in the first embodiment are achieved.

Figure 10A:
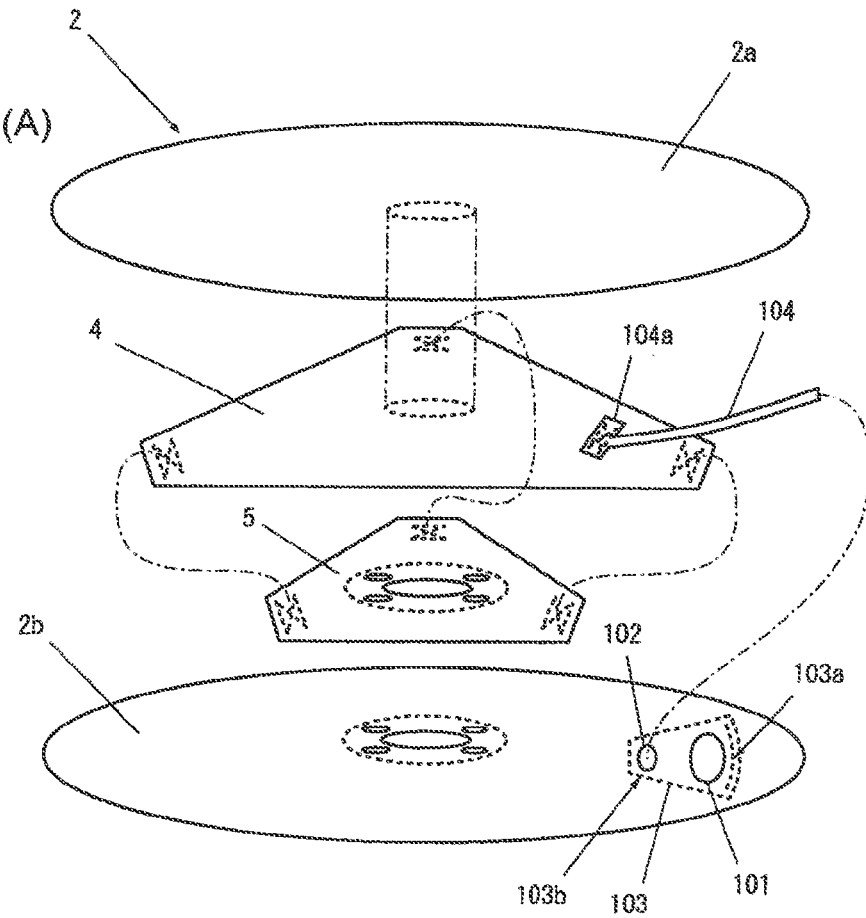
FIG. 10(A) is a partial component exploded view.

Subsequently, a seventh embodiment of the airbag device according to the present invention will be described. Here, FIG. 10 is a drawing showing the seventh embodiment of the airbag device according to the present invention, in which (A) is a partial component exploded view, (B) is a modification of the inner panel, and (C) is a modification of the vent cover. In FIG. 10(A), illustration of the gas generator 1, the retainer 3, and the hold ring 6, which are the common components as in FIG. 1 is omitted. Also, in FIG. 10(A), components common to FIG. 1 are designated by the same reference numeral and overlapped description will be omitted.

In the airbag 2 shown in FIG. 10(A), a vent hole 101 is formed and opening and closing means therefor is provided on the airbag 2 shown in FIG. 1. In other words, the airbag 2 includes the vent hole 101 for discharging gas and an insertion hole 102 formed in the vicinity of the vent hole 101, and includes a vent cover 103 connected at one end thereof to an outer surface of the airbag 2 so as to cover the vent hole 101, and a strap 104 connected to the inner panel 4, and the strap 104 is connected at the other end of the vent cover 103 via the insertion hole 102.

Although the vent hole 101 is generally formed on the rear panel 2*b* in many cases as shown in FIG. 10, it may be formed on the front panel 2*a*. Here, the vent hole 101 is formed at one position, the vent holes 101 may be formed at two or more positions. The shape of the vent hole 101 may be a circular shape as illustrated, may be a rectangular shape, or may be a slit shape. Since the insertion hole 102 is configured to guide the strap 104 into the interior of the airbag 2, it may be of any shape as long as it is larger than the strap 104, and may be a circular shape, a rectangular shape, and a slit shape.

The vent cover 103 may be of any shape as long as it can cover the vent hole 101, and is not limited to the illustrated shape. The vent cover 103 is connected at a front end portion 103*a* to an outer surface (a lower surface in FIG. 10(A)) of the rear panel 2*b* and a rear end portion 103*b* is extended to a position to cover the insertion hole 102, and the strap 104 is connected to an inner surface (an upper surface in FIG. 10(A)) of the rear end portion 103*b*. The strap 104 is a member having a cord shape, and is connected at an end portion 104*a* at one end thereof to an outer surface (the upper surface in FIG. 10(A)) of the inner panel 4, and at the other end thereof to the rear end portion 103*b* of the vent cover 103 seen through the insertion hole 102.

Therefore, the opening and closing means of the vent hole 101 is made up of the insertion hole 102, the vent cover 103, and the strap 104. In this manner, by forming the vent hole 101 and the opening and closing means on the airbag 2, leakage of gas during the expansion and deployment of the airbag 2 can be reduced. When the occupant comes into contact with the airbag 2, the strap 104 is loosened and the vent hole 101 is opened quickly, so that gas can be discharged.

Figure 10B:
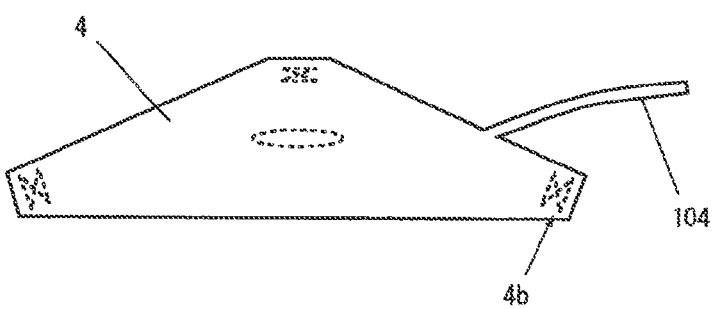
FIG. 10(B) is a modification of the inner panel.
Figure 10C:
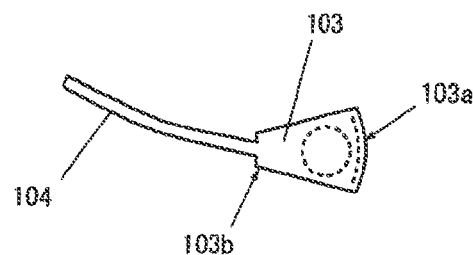
FIG. 10(C) is a modification of the vent cover.

The strap 104 may be integrally formed with the inner panel 4 as shown in FIG. 10(B). In this case, the strap 104 is formed so as to be partly extended from the outline of the inner panel 4. When the strap 104 is formed integrally with the inner panel 4, when setting the outline of the inner panel 4, the portion of the strap 104 is excluded. Although not shown, the strap 104 may be extended radially from an outer peripheral seamed portion 104*b* of the inner panel 4. In addition, the strap 104 may be integrally formed with the vent cover 103 as shown in FIG. 10(C). In this case, the strap 104 may be formed so as to extend from the rear end portion 103*b* of the vent cover 103.

The present invention is not limited to the embodiments described above, and may be modified variously without departing the scope of the present invention as a matter of course, such that the vent hole and the opening and closing means may be provided on the airbags from the first embodiment to the sixth embodiment, the outer peripheral seamed portions of the inner panel may be arranged at five or more positions, the outline of the inner panel may be formed into a polygonal shape more than pentagon, and the present invention is applicable to all the types of airbags (for example, driver airbags, passenger airbags, side airbags, curtain airbags, knee airbags, pedestrian airbags, motorcycle airbags, and so on) having the inner chamber.

The invention claimed is:

1. An airbag configured to be inflated and deployed by gas supplied therein comprising: an inner panel to be arranged in the interior of the airbag, the inner panel including a center seamed portion to be connected to an inner surface of the airbag with respect to the direction of thickness and a plurality of outer peripheral seamed portions to be connected to an inner surface of the airbag apart from the portion where the center seamed portion is connected, wherein the outline of the inner panel includes straight line segments that generally extend between the outer peripheral seamed portions when the inner panel is deployed into a plane is formed into a shape smaller than an arcuate shape which constitutes part of a circle passing through all the outer peripheral seamed portions and larger than an inverted arcuate shape formed by inverting the arcuate shape with respect to a straight line connecting the outer peripheral seamed portions, wherein a communicating port from which gas is supplied to the airbag is formed by the outline of the inner panel including the straight line segments generally extending between the outer peripheral seamed portions, wherein the inner panel constitutes an inner chamber which inflates near a center portion of the airbag first in the initial stage of inflation of the airbag and then supplies gas from the communicating port to an outer periphery of the airbag.

2. The airbag according to claim 1, wherein the outline of the inner panel is formed into a shape following the straight line connecting the outer peripheral seamed portions.

3. The airbag according to claim 1, wherein the inner panel is formed into a polygonal shape as an entire outline when being deployed into a plane.

4. The airbag according to claim 1, wherein the outer peripheral seamed portions are arranged at two to four positions equidistantly on an outer periphery of the inner panel.

5. The airbag according to claim 1, wherein a surface area of an area where the inner panel and the airbag are overlapped when the airbag is deployed into a plane in a state in which the inner panel is connected to the airbag is 0.2 to 0.6 times a surface area of the airbag.

6. The airbag according to claim 1, wherein the airbag includes a connection panel having a surface area smaller than that of the inner panel and the outer peripheral seamed portions and the inner surface of the airbag are connected via the connection panel.

7. The airbag according to claim 1, wherein the airbag includes a front panel to be arranged on the side of an occupant, and a rear panel to be arranged on the side of a vehicle structure, wherein the center seamed portion is connected to the front panel or the rear panel, and the outer peripheral seamed portions are connected to the rear panel or the front panel to which the center seamed portion is not connected.

8. The airbag according to claim 1, comprising a vent hole for discharging gas and an insertion hole formed in the vicinity of the vent hole, and includes a vent cover connected at one end thereof to an outer surface of the airbag so as to cover the vent hole, and a strap connected to the inner panel, and the strap is connected at the other end of the vent cover via the insertion hole.

9. The airbag according to claim 8, wherein the strap is integrally formed with the inner panel or the vent cover.

10. An airbag device comprising: a gas generator configured to generate gas under predetermined conditions, an airbag configured to be inflated and deployed by being connected to the gas generator; and a retainer configured to store the airbag, wherein the airbag is an airbag according to any one of claim 1 to claim 9.

* * * * *